United States Patent [19]

Page

[11] Patent Number: 4,918,894
[45] Date of Patent: Apr. 24, 1990

[54] REFRACTORY SUPPORTING ANCHORING SYSTEM

[75] Inventor: Gary L. Page, Ponca City, Okla.

[73] Assignee: Conoco Inc., Ponca City, Okla.

[21] Appl. No.: 275,045

[22] Filed: Nov. 21, 1988

[51] Int. Cl.$^5$ .................... E06B 1/58; E06B 1/60; E04B 1/41

[52] U.S. Cl. .................... 52/506; 52/509; 422/241

[58] Field of Search .................... 248/DIG. 1; 52/506, 52/509; 110/336, 338, 339, 340; 422/310, 241

[56] References Cited

U.S. PATENT DOCUMENTS

| | | | |
|---|---|---|---|
| 2,358,277 | 9/1944 | Manofsky | 52/506 X |
| 2,515,827 | 7/1950 | Howard | 52/506 X |
| 2,829,877 | 4/1958 | Davis, Jr. | 110/336 X |
| 3,400,672 | 9/1968 | Dickson | 52/506 |
| 3,990,199 | 11/1976 | Gallo | 52/509 X |
| 4,244,269 | 1/1981 | Gorell | 52/506 X |
| 4,255,914 | 3/1981 | Seipos | 52/509 X |
| 4,281,494 | 8/1981 | Weinar | 52/509 X |
| 4,296,580 | 10/1981 | Weinar | 52/509 X |
| 4,333,286 | 1/1982 | Weinar | 52/509 X |
| 4,370,840 | 1/1983 | Bisbee et al. | 52/506 X |
| 4,414,786 | 11/1983 | Frahme | 52/506 |
| 4,440,099 | 4/1984 | Brachet et al. | 52/506 X |
| 4,463,690 | 8/1984 | Hermann et al. | 52/506 X |
| 4,481,749 | 11/1984 | Stirling | 52/509 X |
| 4,498,272 | 2/1985 | Adams | 52/509 X |
| 4,516,374 | 5/1985 | Finney | 52/509 X |
| 4,523,531 | 6/1985 | Bishara | 52/506 X |
| 4,607,472 | 8/1986 | Pointner | 248/DIG. 1 |
| 4,633,636 | 1/1987 | Alexander | 52/506 X |
| 4,753,053 | 1/1988 | Heard | 110/336 X |

Primary Examiner—Barry S. Richman
Assistant Examiner—Amalia Santiago
Attorney, Agent, or Firm—Richard W. Collins

[57] ABSTRACT

A refractory supporting end anchor for the end of a refractory lined conduit, and a lined conduit having a series of the anchors at the end thereof.

7 Claims, 1 Drawing Sheet

REFRACTORY SUPPORTING ANCHORING SYSTEM

BACKGROUND OF THE INVENTION

1. Field of the Invention

This invention relates to refractory lined process equipment such as conduits in reactors, furnaces, cyclone separators, and the like, particularly where high temperature gases containing entrained solids are being processed. More particularly, the invention relates to improved end refractory anchors for such equipment and to insulated structures utilizing such anchors.

Refractory liners have been used for many years in process vessels, reactors, conduits, furnaces and the like to provide thermal insulation, and in environments such as fluidized catalytic reactors or regenerators or stacks, to provide resistance to abrasion or erosion. Such liners can serve not only to thermally insulate a shell or other surface but also to prolong its service life by shielding it from erosion by abrasion. In fluid catalytic cracking units for petroleum hydrocarbons, quite high fluid velocities which may be on the order of 50 to 70 ft/second occur, and the abrasive effect of entrained cracking catalyst is very pronounced. Moreover, high temperatures are involved. For example, in the regenerator the temperature of gases exiting through the cyclones may be on the order of 1250°-1350° F. and in the reactor the temperature may be 800°-900° F. Accordingly, the usual practice has been to line all vessels, conduits and cyclone separators through which fluid with entrained catalyst flows with refractory liner to prevent erosion of the metal surfaces and to provide thermal insulation. To retain the refractory, which may be a refractory cement, a concrete cement-aggregate mixture, or a reinforced cement or concrete, various anchoring arrangements have been employed. Some of the presently utilized anchoring arrangements work quite well on the main surfaces of the liners, but there have been problems with the portion of the liner adjacent the end of conduit outlets and the like.

2. The Prior Art

A common approach to protecting the outlet ends of refractory lined conduits has been the use of stop bars (retainers) welded to the outlet end of the conduits to support the liner. However, particularly in severe service conditions, these stop bars tend to disintegrate and become ineffective such that frequent repair or replacement has been necessary. There has been a need for an improved refractory anchoring system to protect lined conduit outlets. Such a system is provided by this invention.

SUMMARY OF THE INVENTION

According to the present invention, refractory anchors especially suited to protecting the ends of refractory lined conduits or the like are utilized to provide improved service life to the equipment protected by the anchors.

The anchors are metal devices having a slot extending from one end into the anchor such that the anchor can be positioned, by the slot, on the end of a conduit to be protected. The anchor includes elements extending into, below, and outside the end of the conduit, and each element includes refractory supporting tabs formed from the elements and extending therefrom. A series of the anchors spaced about the conduit outlet and covered with refractory provides improved protection to the conduit end as compared to the use of stop bars and the like.

It is an object of the invention to provide an improved system for protecting the ends of refractory lined conduits.

It is a further object to provide an improved refractory anchor for attachment to the end of a conduit which is to be refractory lined.

The above as well additional objects and advantages are obtained by the present invention, as will be apparent from consideration of the detailed description thereof.

THE DRAWINGS

DESCRIPTION OF THE PREFERRED EMBODIMENTS

Figure 3:
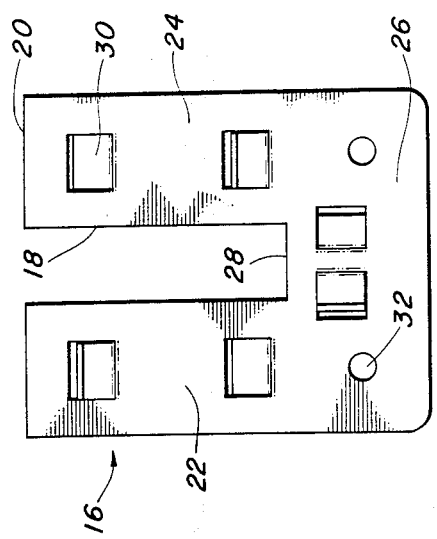
FIGS. 2, 3 and 4 are perspective, end and side views, respectively, of an end anchor in accordance with the invention.
Figure 6:
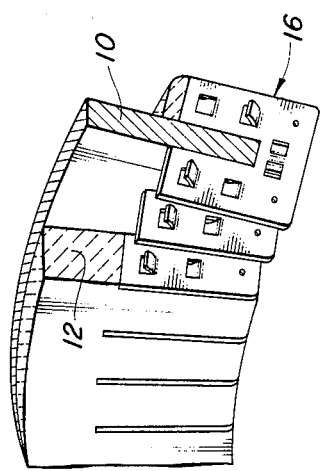
FIG. 6 is a partially cut away perspective view of a portion of a refractory lined conduit end showing a series of end anchors in place on the conduit end.
Figure 4:
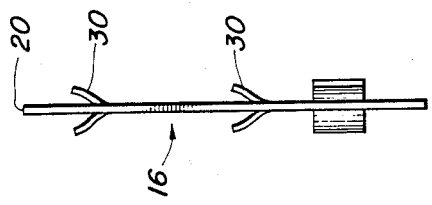
Figure 5:
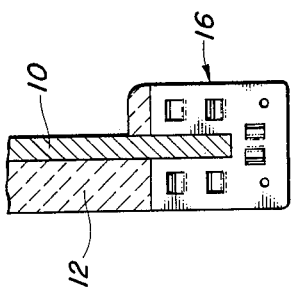
FIG. 5 is a cut away cross-sectional view of a refractory lined conduit end showing the use of an end anchor.
Figure 2:
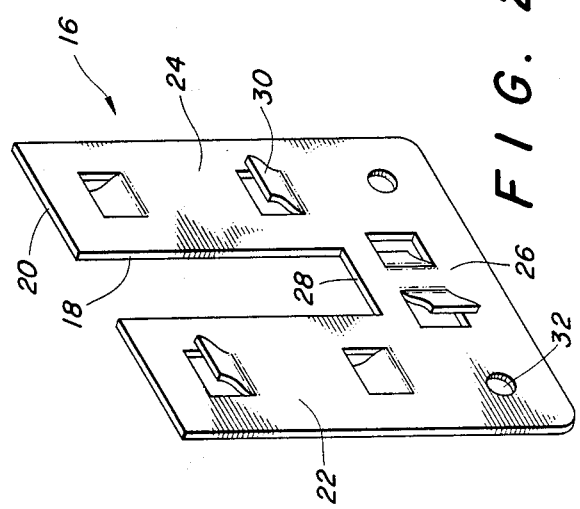

The improved end anchor in accordance with one aspect of the invention is shown in FIGS. 2, 3 and 4. FIGS. 5 and 6 illustrate a refractory lined conduit end utilizing the end anchors of the invention.

Figure 1:
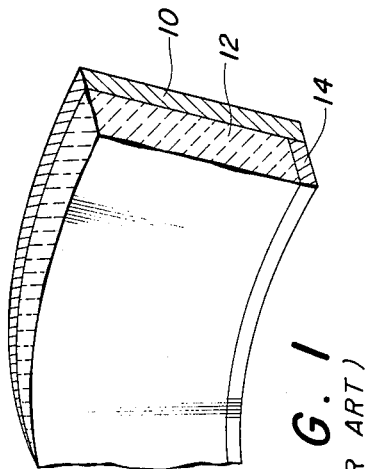
FIG. 1 is a cut away view showing a prior art system for supporting the end of a refractory liner in a conduit.

Referring to FIG. 1, wherein a typical prior art refractory liner end support is depicted, a portion of a conduit 10 having a layer of refractory 12 applied to its inner surface is shown. Refractory 12 typically is retained in position on the surface of conduit 10 by support means (not shown) such as S-bar anchors, welded studs, hexagonal mesh, etc. These prior art support means are typically augmented by use of a stop bar 14 welded to the end of the protected conduit 10 and extending inward a distance equal to the thickness of refractory 12. These stop bars tend to erode in severe service, as they are essentially unprotected from the effects of heat and abrasion.

The present invention was developed in order to overcome the deficiencies of the system depicted in FIG. 1.

Referring now to FIGS. 2, 3 and 4, an end anchor 16 in accordance with the invention has a slot 18 (FIGS. 2 and 3) extending from the top edge 20 into the center portion of the anchor. Refractory supporting elements 22 and 24 extend from the sides of slot 18, and a bottom refractory supporting element 26 extends beyond the inner end 28 of slot 18. Refractory supporting elements 22, 24 and 26 all are shown with a pair of oppositely extending tabs 30 formed from the element. More or fewer tabs could be used, and an anchor with all tabs extending from the same side could be used, but the arrangement shown is preferred. In addition to tabs 30, the anchor is shown with a pair of holes 32, which when filled with refractory provide additional support, although the primary support comes from tabs 30.

Referring now to FIGS. 5 and 6, anchors 16 are shown positioned at intervals about the end of conduit 10 with the space between anchors being filled with refractory 12. A preferred spacing of anchors 16 about the end of conduit 10 is from about 0.5 to about 1.5 times the thickness of refractory liner 12. As shown, refractory 12 extends around the end of conduit 10 and up over a portion of the back of conduit 10 coextensively with refractory supporting elements 22, 24 and 26. Whether liner 12 extends up a part or all of the outer surface of conduit 10 depends on the service involved. In some cases, protection of the outer surface is not essential, and the refractory may extend less than all the way over the back side of anchors 16.

In preparing an insulated structure in accordance with the invention, anchors 16 are first attached to the end of conduit 10, and then a layer of refractory 12 is placed on the inner surface of conduit 10 in a conventional manner, using an anchoring system on the main surface if desired. The refractory also fills the spaces between end anchors 16 and the openings in the anchors, to provide maximum support.

End anchors in accordance with the invention, when distributed about the end of a lined conduit with the spaces between anchors filled with refractory, provide improved protection compared to use of stop bars at the conduit end. When prior art stop bars fail in service, the liner above the bars tends to fail also, resulting in a requirement for repair of the refractory liner and sometimes also the lined conduit. While the anchors as shown have all the refractory supporting elements 22, 24 and 26 of the same width, that is not an essential feature, although as a practical matter this is the way the anchors would normally be formed.

Variations in the details of the anchors, such as number, shaped, size, etc. of tabs and holes, could be made without departing from the scope of the invention, which is to be defined by the appended claims.

I claim:

1. In an insulated structure comprising a metal member having an interior surface and an open end, said interior surface having an applied thermally insulating refractory liner, and said liner extending to said open end, the improvement wherein:
   a plurality of refractory supporting anchors are attached to said open end in a substantially uniformly spaced pattern, said anchors including:
   (a) a plate with a slot defined therein for insertion onto, and attachment to, said open end of said metal member; and
   (b) at least one refractory supporting element defined longitudinally on each of said plates defining lateral sides of said slot and extending for a distance equal to the thickness of said refractory liner, said refractory supporting elements being substantially surrounded by said applied refractory.

2. The structure of claim 1 wherein said anchors are spaced apart a distance of from 0.5 to 1.5 times the thickness of said liner.

3. The structure of claim 1 wherein each of said anchor plates includes an end refractory supporting element extending from said open end a distance equal to the thickness of said refractory liner.

4. The structure of claim 3 wherein each of said anchor plates includes an outwardly extending refractory supporting element, and said refractory liner extends coextensively with said outwardly extending supporting elements.

5. The structure of claim 4 wherein each of said anchor plates includes at least one opening therein, said opening being filled with refractory comprising a part of said refractory liner.

6. The structure of claim 4 wherein each of said refractory supporting elements includes at least one refractory retaining tab formed from said element refractory supporting and extending outwardly therefrom.

7. The structure of claim 6 wherein each of said refractory supporting elements includes first and second refractory retaining tabs made from said plate and extending from opposite sides of said refractory supporting elements.

* * * * *